United States Patent
Bocaletti et al.

(10) Patent No.: US 10,789,282 B1
(45) Date of Patent: Sep. 29, 2020

(54) DOCUMENT INDEXING WITH CLUSTER COMPUTING

(71) Applicant: Dell Products L.P., Round Rock, TX (US)

(72) Inventors: Luis Bocaletti, Chicago, IL (US); Raja Munishwar Gudipati, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 309 days.

(21) Appl. No.: 15/884,750

(22) Filed: Jan. 31, 2018

(51) Int. Cl.
*G06F 16/17* (2019.01)
*G06F 16/31* (2019.01)
*G06F 16/35* (2019.01)
*G06F 16/93* (2019.01)

(52) U.S. Cl.
CPC ........ *G06F 16/355* (2019.01); *G06F 16/1734* (2019.01); *G06F 16/328* (2019.01); *G06F 16/93* (2019.01)

(58) Field of Classification Search
CPC .. G06F 16/355; G06F 16/328; G06F 16/1734; G06F 16/93
See application file for complete search history.

(56) References Cited

U.S. PATENT DOCUMENTS

| | | | | |
|---|---|---|---|---|
| 2007/0112803 | A1* | 5/2007 | Pettovello | G06F 16/1837 |
| 2008/0114730 | A1* | 5/2008 | Larimore | G06F 16/3325 |
| 2010/0106678 | A1* | 4/2010 | Pietrek | G06F 11/3476 |
| | | | | 706/54 |
| 2010/0205160 | A1* | 8/2010 | Kumar | G06F 16/31 |
| | | | | 707/696 |
| 2014/0149401 | A1* | 5/2014 | Liu | G06F 16/319 |
| | | | | 707/723 |
| 2014/0188840 | A1* | 7/2014 | Agarwal | G06F 16/2228 |
| | | | | 707/711 |
| 2017/0091308 | A1* | 3/2017 | Tan | G06F 16/2228 |

* cited by examiner

*Primary Examiner* — Jorge A Casanova
(74) *Attorney, Agent, or Firm* — Ryan, Mason & Lewis, LLP

(57) ABSTRACT

Methods, apparatus, and processor-readable storage media for document indexing with cluster computing are provided herein. An example computer-implemented method includes obtaining and monitoring a list of document identifiers corresponding to documents to be indexed as part of an indexing process across at least a portion of a computing cluster; initiating the indexing processing based on one or more inputs; iteratively requesting at least one of the document identifiers; obtaining, from across at least a portion of the computing cluster, a document corresponding to a document identifier provided in response to the request; and carrying out one or more functions related to the indexing process on the obtained document.

20 Claims, 10 Drawing Sheets

DOCUMENT INDEXING WITH CLUSTER COMPUTING

FIELD

The field relates generally to information processing systems, and more particularly to techniques for indexing documents across one or more systems.

BACKGROUND

Enterprises and users maintaining websites commonly index large numbers of documents in an attempt to create searchable information for other users accessing the websites. However, there exists a significant problem in conventional practice in that document indexing remains a process-intensive task. Because conventional document indexing processes are time-consuming, document indexing is commonly carried out as a batch job during overnight hours, potentially only once per day. In between such batch jobs, however, related systems can plausibly be working with stale documents and/or outdated information.

SUMMARY

Illustrative embodiments of the present invention provide information processing systems configured to perform document indexing with cluster computing.

In one embodiment, an apparatus comprises a processing platform that includes one or more processing devices each comprising a processor coupled to a memory. The processing platform is configured to implement at least a portion of a computing cluster. The processing platform further comprises at least one indexer component resident on at least one of the one or more processing devices, wherein the at least one indexer component is configured to obtain and monitor a list of document identifiers corresponding to documents to be indexed as part of an indexing process across at least a portion of the computing cluster; and initiate the indexing processing based on one or more inputs. The processing platform further comprises multiple source components resident on at least one of the one or more processing devices, wherein each of the multiple source components is configured to iteratively request at least one of the document identifiers from the at least one indexer component; obtain, from across at least a portion of the computing cluster, a document corresponding to a document identifier provided to the source component by the at least one indexer component in response to the request; and carry out one or more functions related to the indexing process on the document.

Illustrative embodiments of the invention can provide significant advantages relative to conventional batch processing document indexing. For example, challenges associated with batch processing document indexing are overcome through the use of cluster computing, wherein multiple source components are created and configured to iteratively carry out individual document indexing tasks in coordination with one or more indexer components, thereby distributing the workload per indexer component and reducing the amount of time required to complete an indexing process.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more cloud hosting tenants that access cloud resources. Numerous other system configurations are possible in other embodiments.

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
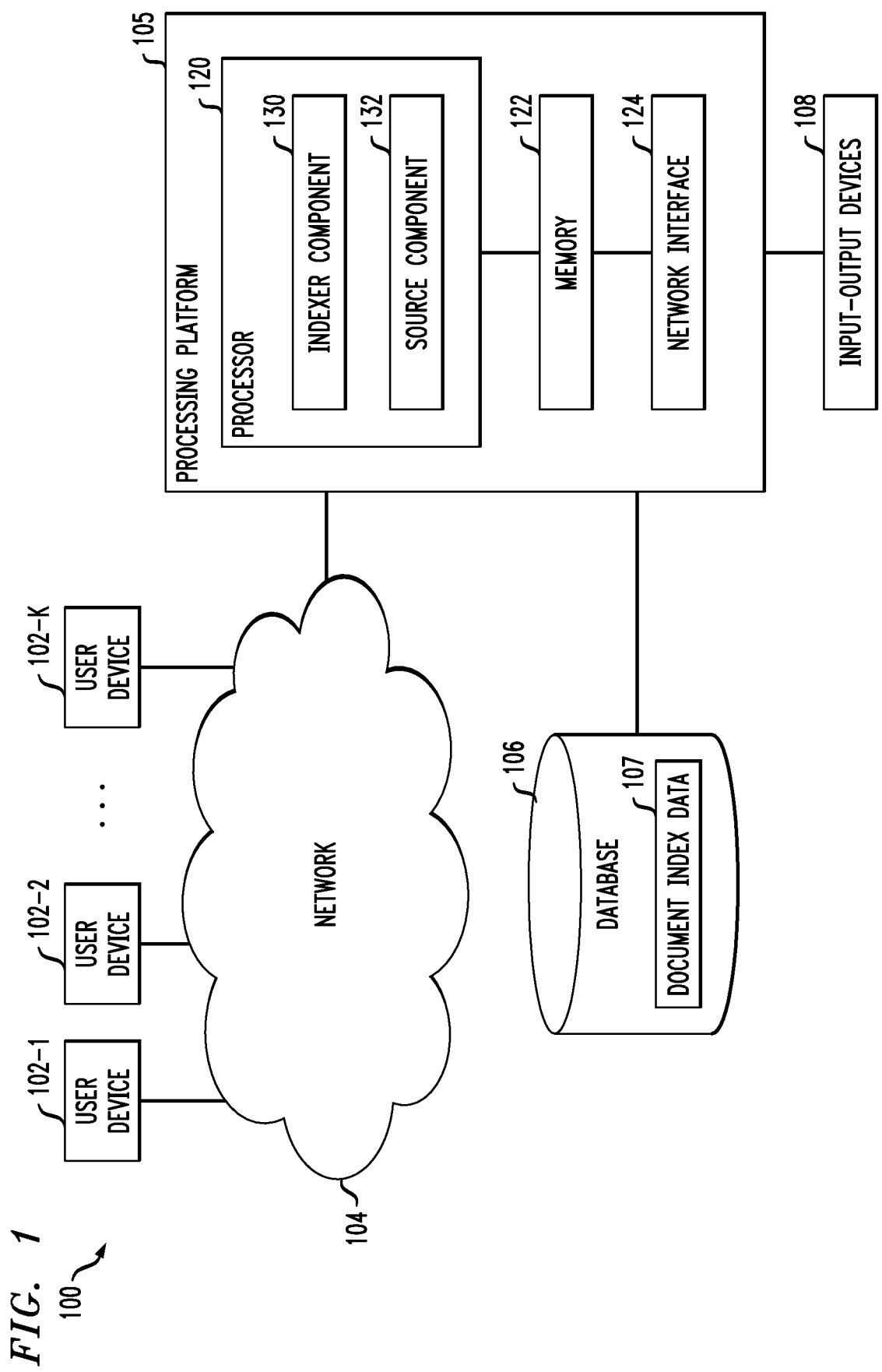
FIG. 1 is a block diagram of an information processing system configured for document indexing with cluster computing in an illustrative embodiment.

FIG. 1 shows information processing system (also referred to herein as computer network) 100 configured in accordance with an illustrative embodiment of the invention.

The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The processing platform 105 has an associated database 106 configured to store document index data 107, as further detailed herein.

The database 106 in the present embodiment is implemented using one or more storage systems associated with the processing platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

The document index data 107 illustratively comprise information pertaining to multiple documents across multiple data sources, indexing objectives and/or requirements associated with various documents and/or various users, etc.

Also associated with the processing platform 105 are input-output devices 108, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the processing platform 105 to communicate over the network 104 with the user devices 102, and illustratively comprises one or more conventional transceivers.

The processor 120 further comprises an indexer component 130 and a source component 132.

It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be combined into a single module, or separated across a larger number of modules. As another example, multiple distinct processors can be used to implement different ones of the modules 130 and 132 or portions thereof.

At least portions of the indexer component 130 and source component 132 may be implemented at least in part in the form of software that is stored in memory 122 and executed by processor 120.

It is to be understood that the particular set of elements shown in FIG. 1 for dynamic document indexing involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the processing platform 105 can be eliminated and associated elements such as indexer component 130 and source component 132 can be implemented elsewhere in the computer network 100.

An exemplary process utilizing indexer component 130 and source component 132 of the processing platform 105 in computer network 100 will be described in more detail with reference to the flow diagram of FIG. 9.

The term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 105 of the FIG. 1 embodiment will be described in more detail below in conjunction with FIGS. 10 and 11. A given such processing platform comprises at least one processing device comprising a processor coupled to a memory. Additionally, the operation of the information processing system 100 will be described in further detail with reference to the flow diagram of FIG. 9.

As described and illustrated herein, at least one embodiment of the invention includes creating a document indexing system on top of a cluster computing platform. As used herein, cluster computing refers to computing across a distributed set of connected computing devices (such as devices 102 in FIG. 1) and/or information processing systems (such as system 100 in FIG. 1) that operate within a larger a system. Increased power resulting from such an embodiment minimizes the time required to run a document indexing process, and can thereby enable an entity/enterprise to run the indexing process more often and/or on demand.

FIG. 2 through FIG. 6 show an illustrative embodiment of multiple nodes configured for document indexing in an illustrative embodiment. By way of illustration, FIG. 2 through FIG. 6 depict node 202, node 204 and node 206. Node 202 includes an indexer component 208 as well as a document identifier and status list 210. Node 204 includes processor 212 and processor 214, while node 206 includes processor 216 and processor 218. Processors 212, 214, 216 and 218 are also referred to herein as source components, and each includes functionalities such as reading (R), mapping (M), saving (S), enriching, etc.

In accordance with one or more embodiments of the invention, the indexer component 208 can read documents from multiple sources, and the indexer component 208 obtains the list 210 of documents to index/process. The indexer component 208 can also create and/or configure multiple source components in a cluster (such as, for example, source components 212, 214, 216 and 218). Such source components are signaled to ask for a document identifier (ID) from the indexer component 208 on which to work. Accordingly, a source component can then receive a document ID and process the corresponding document through one or more sub-components and/or functionalities. The source component subsequently notifies the indexer component 208 when a document has been processed. Additionally, the indexer component 208 stops the indexing process once all documents have been processed by the source components.

In one or more embodiments of the invention, source components can include distributed actor systems, wherein the actors form a hierarchy or a graph based on parent/child relationships. Additionally, certain actors referred to as routers can act as a gateway to a group of actors, and routers can also specify different strategies to route messages. Further, at least one embodiment of the invention includes specifying actor systems structure and distribution strategy via configuration. Dependencies can be accessed, for example, by name or group name. Additionally, in one or more embodiments of the invention, such dependencies can be one or more actors which can receive messages from the given actor (such as, for example, mappers, sources, enrichers, etc.). The configuration can include, for example, the name, the type of actor, and one or more additional settings. Further, the configuration can also include parameters to create multiple instances of a component distributed across the nodes in a source component cluster.

Through configuration, at least one embodiment of the invention can include specifying the number of instances per component to create, as well as the behavior of the instances (round robin, broadcast, random, etc.). As used in this context, an "instance" refers to a copy of a type of actor/dependency. For example, assume that there is a request for two source actors per node, configured with a round robin router type. If there are two nodes, there will be four source actors, and each such actor is an "instance." Further, in connection with the above-noted example, different type of routers can include a broadcast router (which forwards a message it receives to all of its routers), a round robin router (which sends each message in-turn to the next actor in order, based upon the ordered sequence of available routees), and a random router (which creates a pool of routees). Accordingly, work can be distributed amongst the instances through the use of a router component created based on the configuration. Also, such a configuration is recursive because each dependency is specified using the same structure.

Such an embodiment of the invention can thereby include an ability to change dependencies without code deployment, as well as an ability to modify work distribution behavior via the configuration, and the ability to instantiate the same component in a different context (pool size, settings, etc.).

Figure 2:
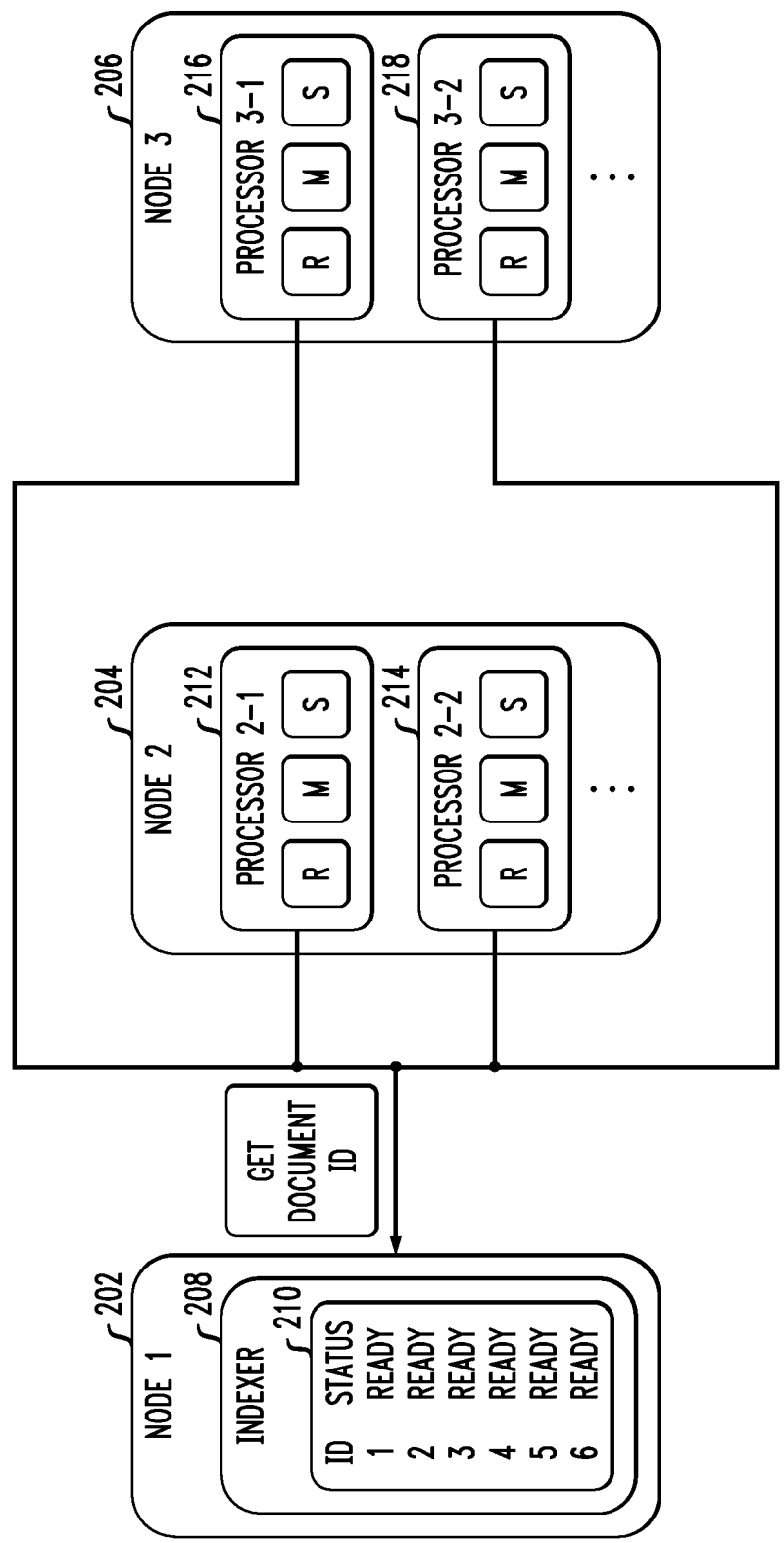
FIG. 2 shows another illustrative embodiment of multiple nodes configured for document indexing in an illustrative embodiment.
Figure 3:
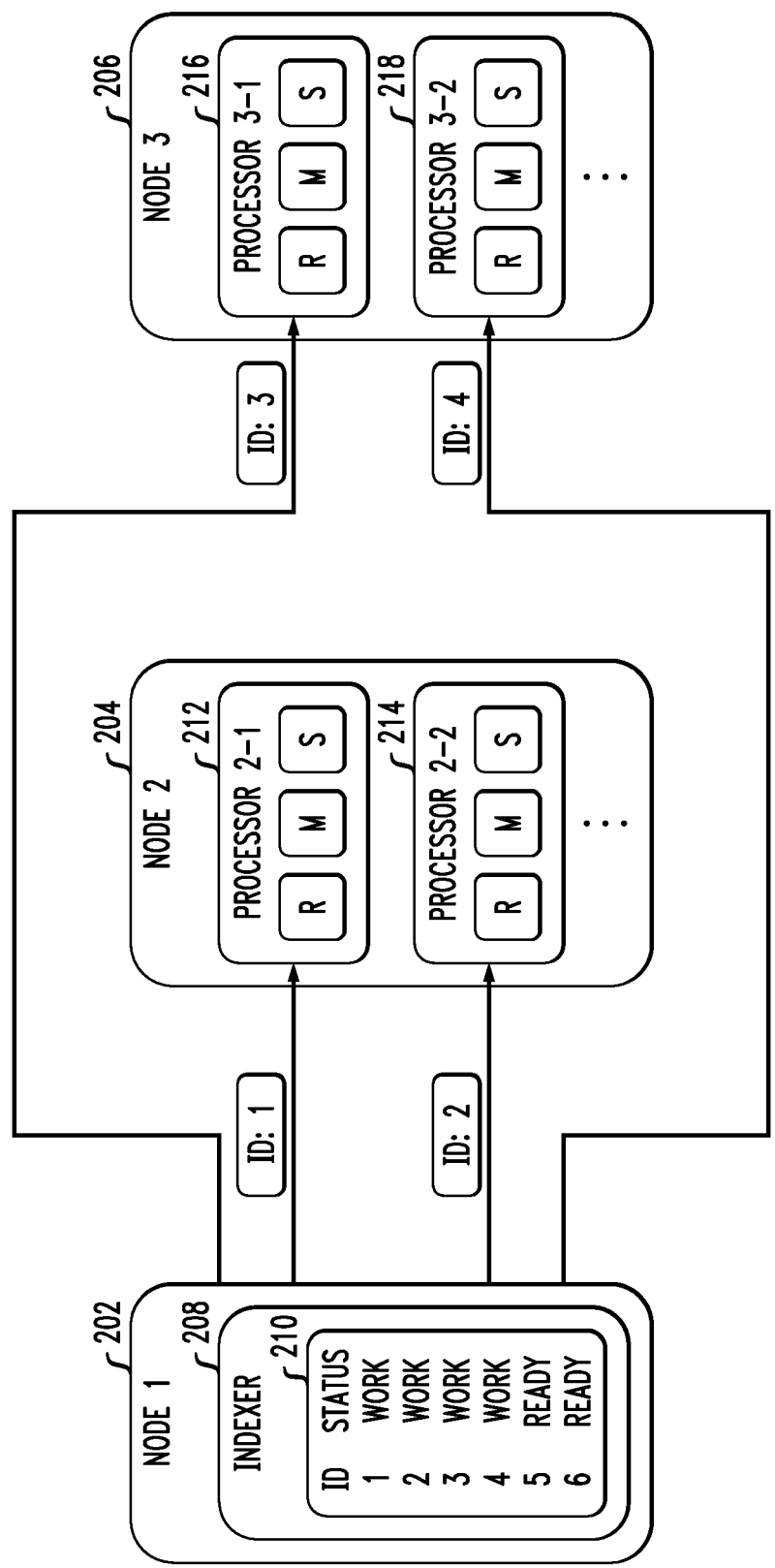
FIG. 3 shows another illustrative embodiment of multiple nodes configured for document indexing in an illustrative embodiment.

Referring again to the drawings, FIG. 2 depicts source components 212, 214, 216 and 218 each requesting a document ID from the indexer component 208, while list 210 indicates that document IDs 1-6 all maintain a status of "Ready." In FIG. 3, the indexer component 208 provides document ID 1 to source component 212, document ID 2 to source component 214, document ID 3 to source component 216, and document ID 4 to source component 218, while list 210 indicates that document IDs 1-4 update to a status of "Work," while document IDs 5-6 maintain a status of "Ready."

Figure 4:
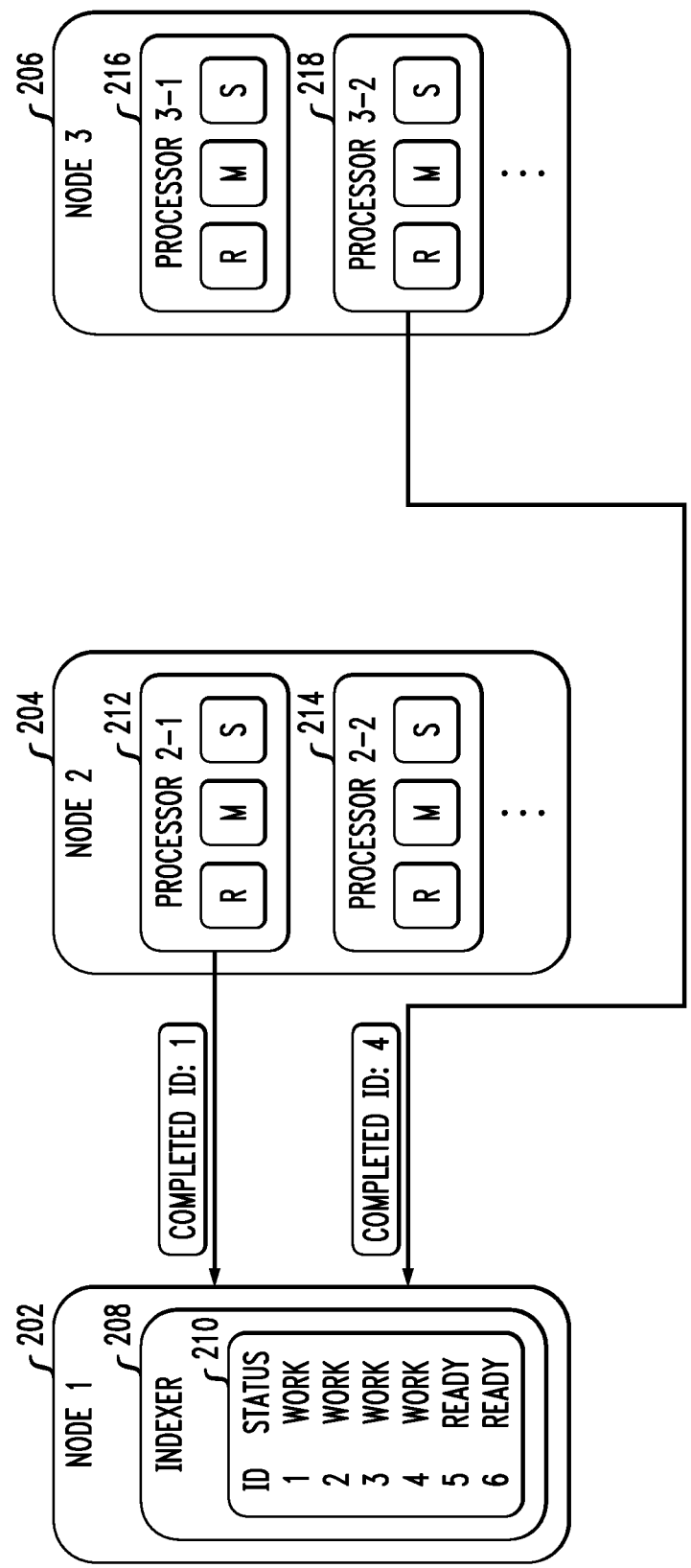
FIG. 4 shows another illustrative embodiment of multiple nodes configured for document indexing in an illustrative embodiment.
Figure 5:
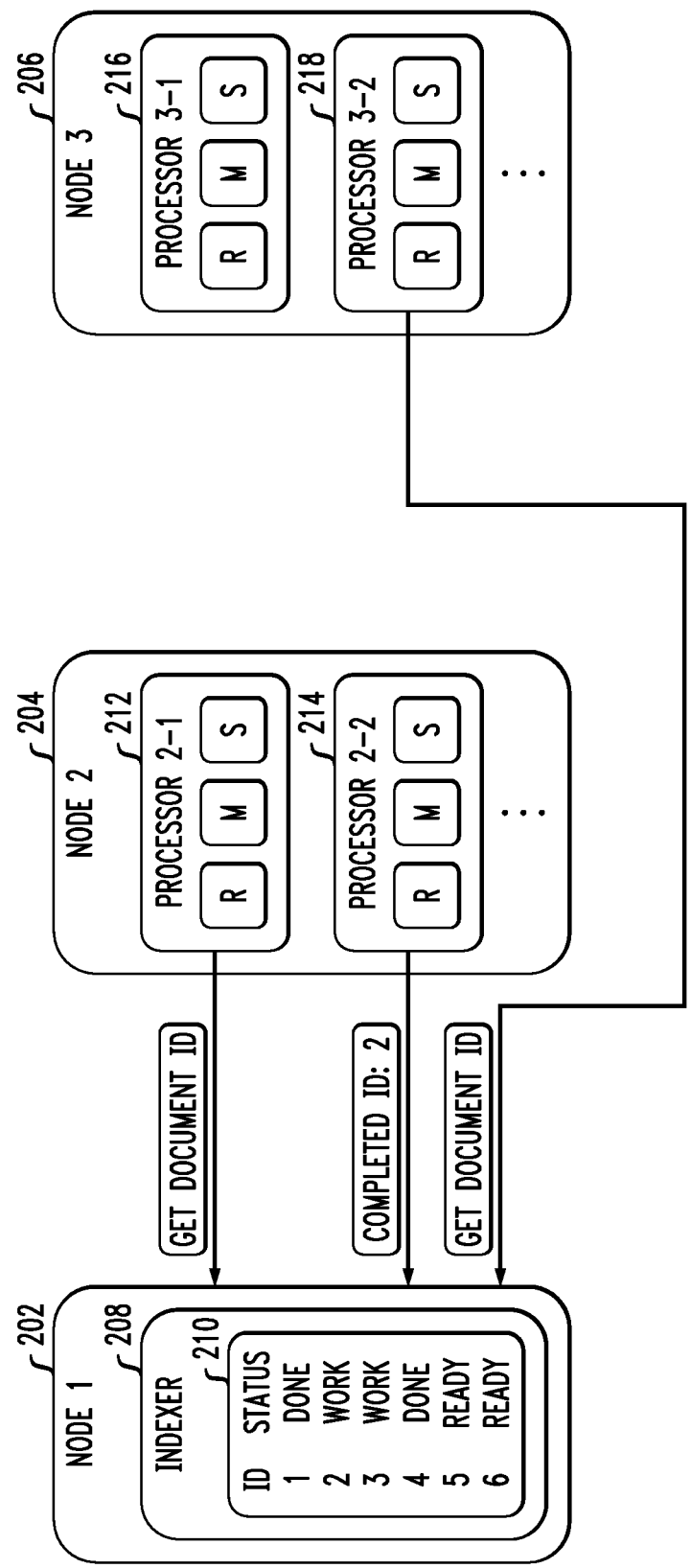
FIG. 5 shows another illustrative embodiment of multiple nodes configured for document indexing in an illustrative embodiment.
Figure 6:
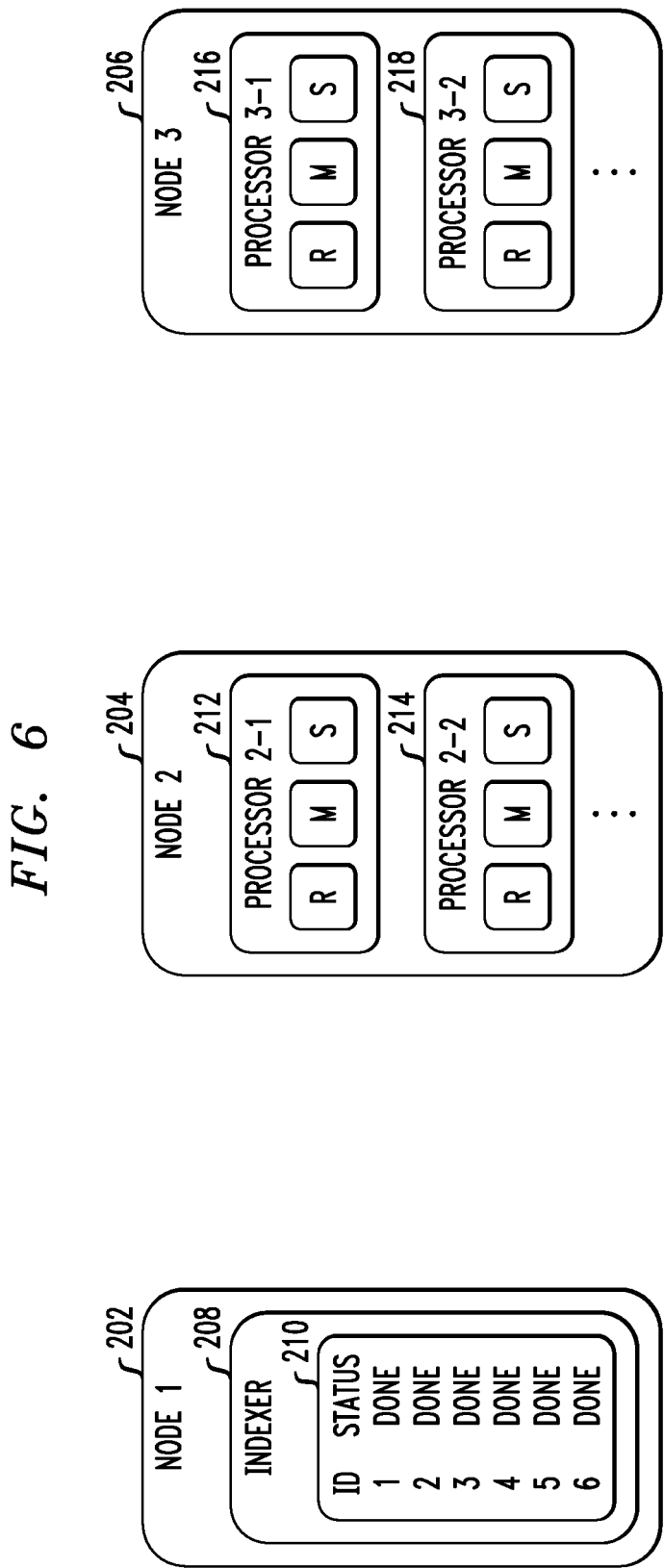
FIG. 6 shows yet another illustrative embodiment of multiple nodes configured for document indexing in an illustrative embodiment.

In FIG. 4, source component 212 reports to the indexer component 208 that document ID 1 has been completed, and source component 218 reports to the indexer component 208 that document ID 4 has also been completed. In FIG. 5, list 210 has been updated to show that document IDs 1 and 4 have statuses that have been modified to "Done." As also depicted in FIG. 5, source components 212 and 218 request a new document ID from the indexer component 208, while source component 214 reports to the indexer component 208 that document ID 2 has been completed. Additionally, FIG. 6, depicts a subsequent outcome wherein the list 210 indicates that all of the document IDs have been processed (with statuses of "Done"), at which point, the indexer component 208 stops the indexing process.

Figure 7:
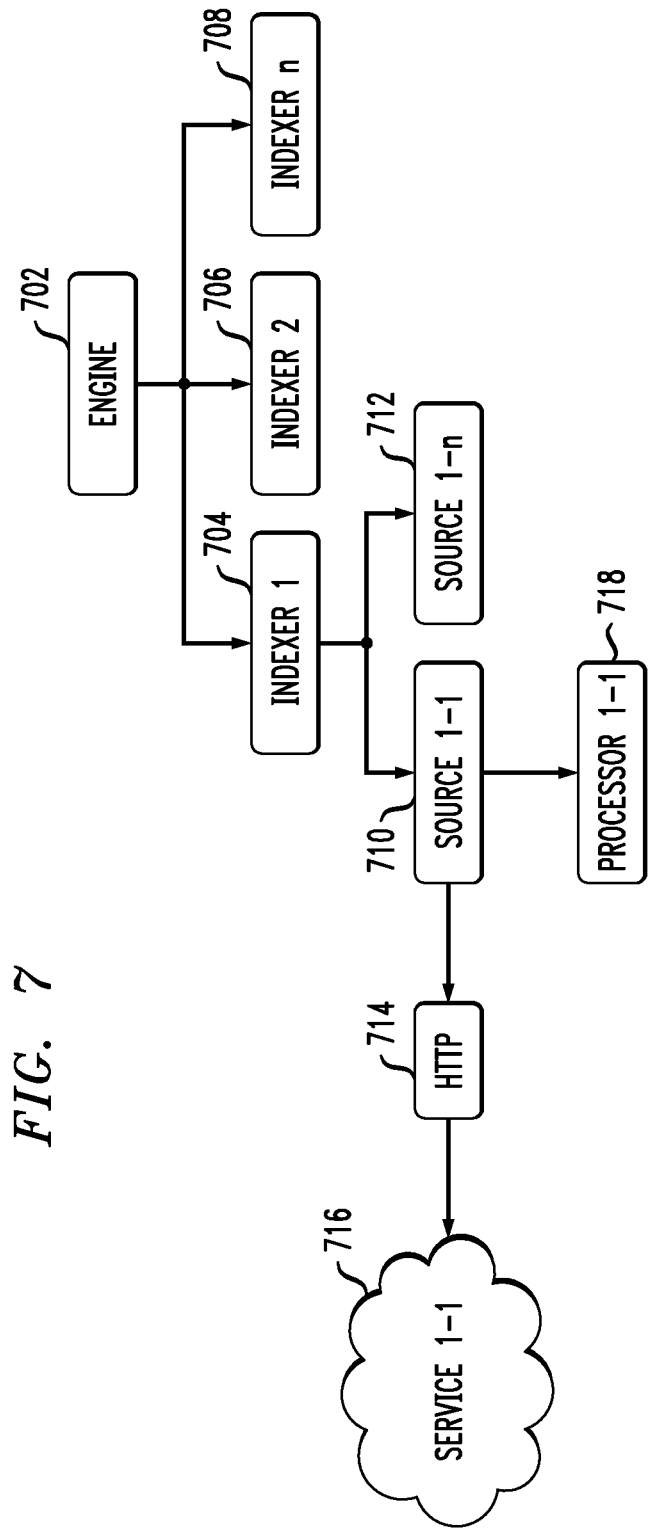
FIG. 7 shows an illustrative embodiment of an information processing system configured for document indexing with cluster computing in an illustrative embodiment.

FIG. 7 shows an illustrative embodiment of an information processing system configured for document indexing with cluster computing in an illustrative embodiment. By way of illustration, FIG. 7 depicts an engine 702, which can include multiple indexers, such as indexers 704, 706 and 708. Engine 702 keeps track of the indexers 704, 706 and 708. When all indexers are completed, the engine 702 will report the indexing job as done. In one or more embodiments of the invention, the engine 702 can include a processor, which can create an actor system, load a configuration, and create a new application domain in which actors are created for running the indexing process. Additionally, each indexer, such as indexer 704, for example, can include multiple source components, such as source components 710 and 712. Further, each source component, such as source component 710, can include one or more processors, such as processor 718. Additionally HTTP processor 714 used to connect service component 716 to source component 710 to retrieve a list of document IDs to index (and subsequently to retrieve the actual documents). Specifically, the HTTP processor 714 can run a hypertext transfer protocol (HTTP) request to fetch the output from a source system (such as source component 710), while service component 716 can include a processor that is responsible for holding information of the source component, as well as for fetching the information from the source component.

Figure 8:
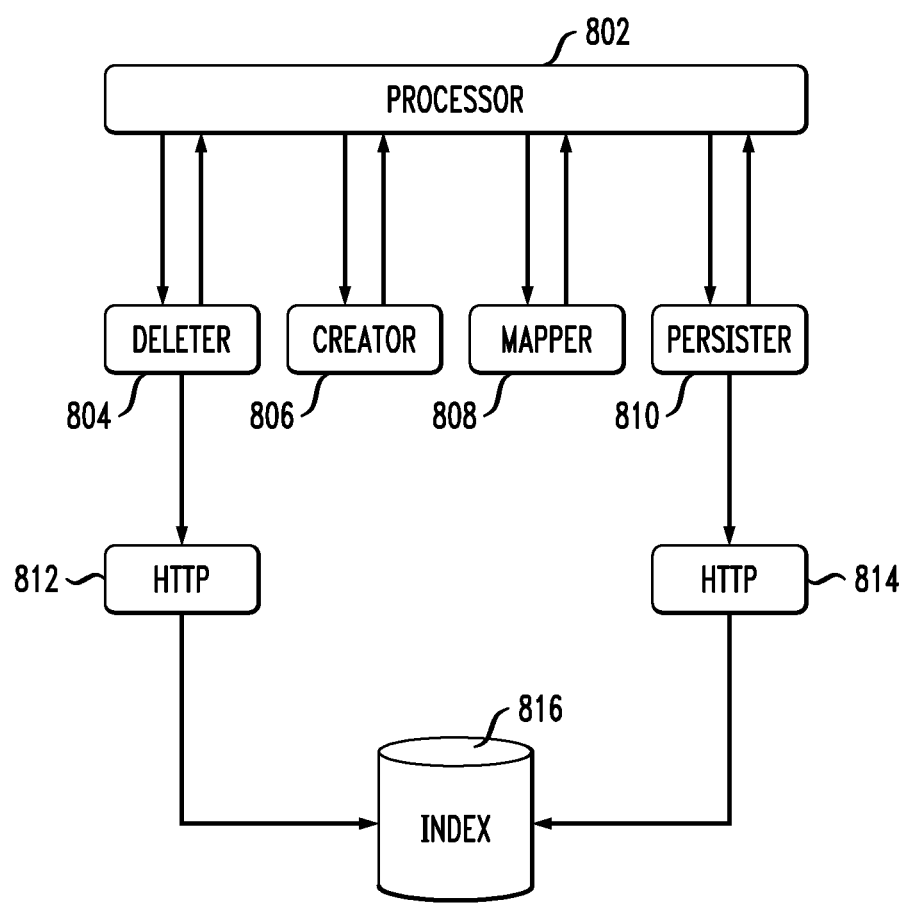
FIG. 8 shows an illustrative embodiment of a portion of an information processing system configured for document indexing with cluster computing in an illustrative embodiment.

FIG. 8 shows an illustrative embodiment of a portion of an information processing system configured for document indexing with cluster computing in an illustrative embodiment. By way of illustration, FIG. 8 depicts a source component, which can include a processor 802, which interacts and/or operates multiple sub-components and/or functionalities such as, for example, a delete 804, a creator 806, a mapper 808, and a persister 810. The creator processor 806 can initiate a new target document and copy the source document data and/or create an-in memory representation of the document. The persister processor 810 can persist to a configured data store and/or save a document to the index. Sub-components 804, 806, 808 and 810 can additionally provide indexing process-related input to a database 816 via one or more HTTP components such as component 812 and 814, which can be used to communicate with a documents index repository 816.

As noted herein, the operation of the information processing system 100 is described in further detail with reference to the flow diagram of the example embodiment of FIG. 9. The process as shown includes steps 900 through 908, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

Step 900 includes obtaining and monitoring a list of document identifiers corresponding to documents to be indexed as part of an indexing process across at least a portion of a computing cluster. Such a step can be carried out, for example, by indexer component 130 in the FIG. 1 embodiment. Additionally, in at least one embodiment of the invention, an indexer component can be configured to generate the list of documents to be indexed as part of the indexing process.

Step 902 includes initiating the indexing processing based on one or more inputs. Such a step can be carried out, for example, by indexer component 130 in the FIG. 1 embodiment. The one or more inputs can include, for example, a user-provided schedule, a pre-determined triggering event, and/or an on-demand user request.

Step 904 includes iteratively requesting at least one of the document identifiers. Such a step can be carried out, for example, by source component 132 in the FIG. 1 embodiment.

Step 906 includes obtaining, from across at least a portion of the computing cluster, a document corresponding to a document identifier provided in response to the request. Such a step can be carried out, for example, by source component 132 in the FIG. 1 embodiment.

Step 908 includes carrying out one or more functions related to the indexing process on the obtained document. Such a step can be carried out, for example, by source component 132 in the FIG. 1 embodiment, and as also illustrated via processor component 718 in FIG. 7 and processor component 802 in FIG. 8. The one or more functions related to the indexing process can include mapping one or more fields from at least a first document location to at least a second document location, enriching the document with one or more items of information, reading the document, and/or saving the document, subsequent to carrying out the one or more functions, to the at least one indexer component.

Additionally, in at least one embodiment of the invention, each source component is also configured to report, to at least one indexer component, completion of the one or more functions on the document. Further, in one or more embodiments of the invention, an indexer component can be configured to monitor a status attributed to each respective one of the documents in the list during the indexing process, and ultimately terminate the indexing processing upon completion, by the multiple source components, of the one or more functions on all of the documents to be indexed.

Further, in one or more embodiments of the invention, the processing platform can also include a source component re-configuration module configured to modify the one or more functions to be carried out by the multiple source components. Modifying the one or more functions to be carried out by the multiple source components can include adding one or more additional functions to be carried out by the multiple source components, removing one or more of the functions to be carried out by the multiple source components, and/or updating at least one of one or more parameters and one or more settings for one or more existing functions.

Figure 9:
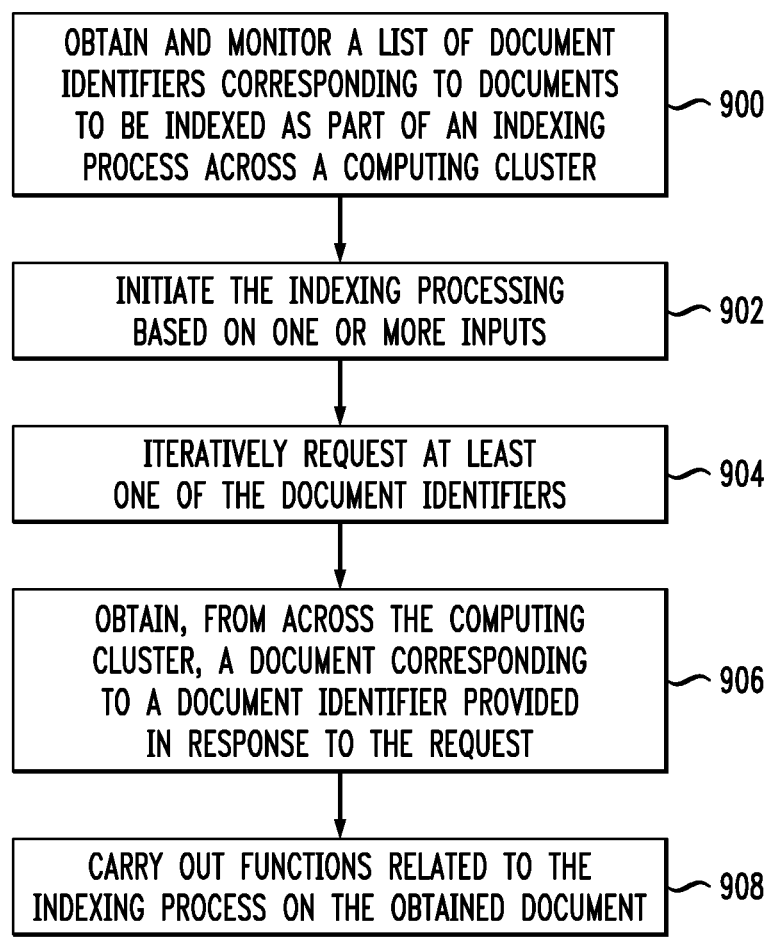
FIG. 9 is a flow diagram of a process for document indexing with cluster computing in an illustrative embodiment.

The particular processing operations and other system functionality described in conjunction with the flow diagram of FIG. 9 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of document indexing with cluster computing as disclosed herein can provide a number of significant advantages relative to conventional arrangements.

For example, some embodiments can advantageously reduce the time required to complete an indexing process, facilitating the ability to run the indexing process multiple times a day, any time a change occurs, etc. Also, one or more embodiments can reduce the likelihood of working with stale documents. Additionally, some embodiments can allow processing steps to be added to the indexing process without changing design. Further, one or more embodiments can provide robustness, whereby if a given node becomes incapable of functioning, the related work can be assumed by another node.

Such arrangements overcome the difficulties that would otherwise be associated with existing batch processing document indexing techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Containers (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
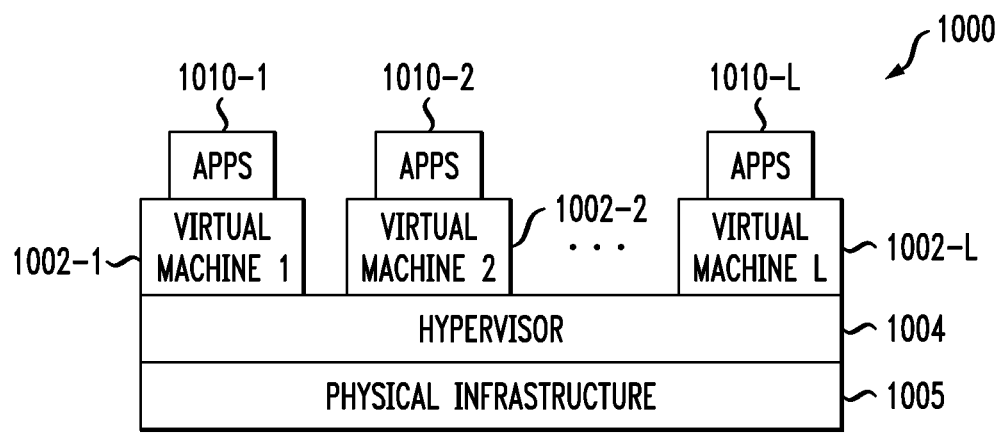
FIGS. 10 and 11 show examples of processing platforms that may be utilized to implement at least a portion of an information processing system in illustrative embodiments.
Figure 11:
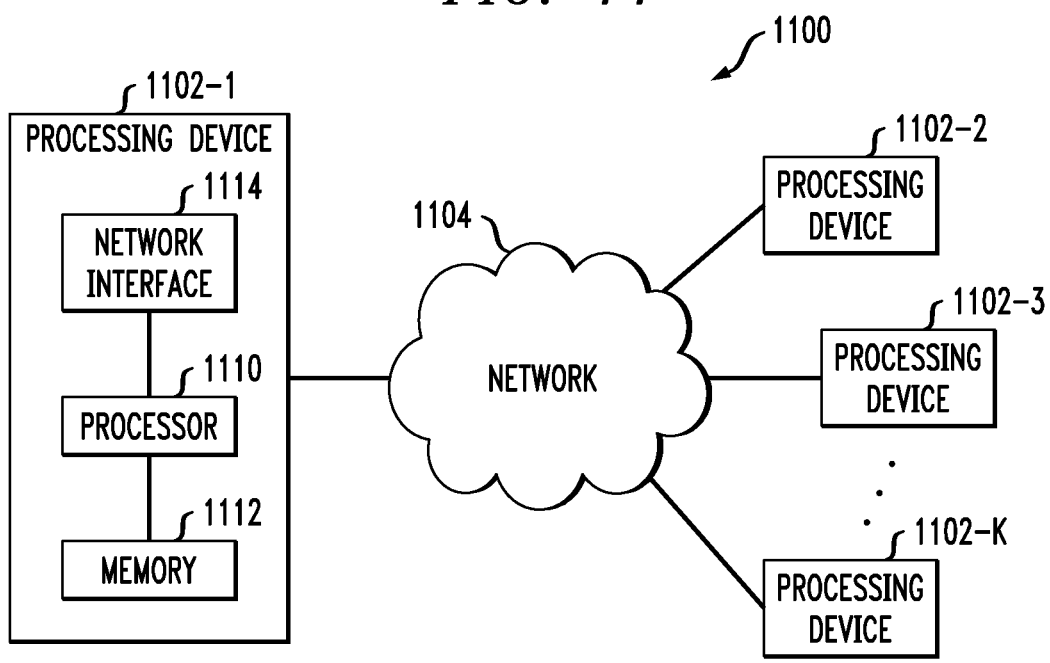

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises VMs 1002-1, 1002-2, . . . 1002-L implemented using a hypervisor 1004. The hypervisor 1004 runs on physical infrastructure 1005. The cloud infrastructure 1000 further comprises sets of applications 1010-1, 1010-2, . . . 1010-L running on respective ones of the virtual machines 1002-1, 1002-2, . . . 1002-L under the control of the hypervisor 1004.

Although only a single hypervisor 1004 is shown in the embodiment of FIG. 10, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1004 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide flexible and robust index processing. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
    at least one processing platform comprising one or more processing devices each comprising a processor coupled to a memory;
    the processing platform being configured to implement at least a portion of a computing cluster;
    wherein the processing platform further comprises:
    at least one indexer component resident on at least one of the one or more processing devices, wherein the at least one indexer component is configured to:
        obtain and monitor a list of document identifiers corresponding to documents to be indexed as part of an indexing process across at least a portion of the computing cluster;
        configure multiple source components resident on at least one of the one or more processing devices, wherein each of the multiple source components comprises a distributed actor system of multiple actors corresponding to one or more functions related to the indexing process, wherein the distributed actor system is hierarchical based at least in part on one or more communication dependencies among the multiple actors, and wherein configuring the multiple source components comprises specifying a number of instances of each actor per source component and a communication behavioral style associated with each instance; and initiate the indexing process based on one or more inputs; and wherein each of the multiple source components is configured to:
- iteratively request at least one of the document identifiers from the at least one indexer component;
- obtain, from across at least a portion of the computing cluster, a document corresponding to a document identifier provided to the source component by the at least one indexer component in response to the request; and
- carry out at least one of the one or more functions related to the indexing process on the document.

2. The apparatus of claim 1, wherein each of the multiple source components is further configured to report, to the at least one indexer component, completion of the one or more functions on the document.

3. The apparatus of claim 1, wherein the at least one indexer component is further configured to generate the list of documents to be indexed as part of the indexing process.

4. The apparatus of claim 1, wherein the at least one indexer component is further configured to terminate the indexing process upon completion, by the multiple source components, of the one or more functions on all of the documents to be indexed.

5. The apparatus of claim 1, wherein the at least one indexer component is configured to monitor a status attributed to each respective one of the documents in the list during the indexing process.

6. The apparatus of claim 1, wherein the one or more inputs comprises a user-provided schedule.

7. The apparatus of claim 1, wherein the one or more inputs comprises a pre-determined triggering event.

8. The apparatus of claim 1, wherein the one or more inputs comprises an on-demand user request.

9. The apparatus of claim 1, wherein the one or more functions related to the indexing process comprises mapping one or more fields from at least a first document location to at least a second document location.

10. The apparatus of claim 1, wherein the one or more functions related to the indexing process comprises enriching the document with one or more items of information.

11. The apparatus of claim 1, wherein the one or more functions related to the indexing process comprises reading the document.

12. The apparatus of claim 1, wherein the one or more functions related to the indexing process comprises saving the document, subsequent to carrying out the one or more functions, to the at least one indexer component.

13. The apparatus of claim 1, wherein the processing platform further comprises a source component re-configuration module configured to modify the one or more functions to be carried out by the multiple source components.

14. The apparatus of claim 13, wherein modifying the one or more functions to be carried out by the multiple source components comprises at least one of:
- adding one or more additional functions to be carried out by the multiple source components;
- removing one or more of the functions to be carried out by the multiple source components; and
- updating at least one of one or more parameters and one or more settings for one or more existing functions.

15. A computer-implemented method comprising:
- obtaining and monitoring a list of document identifiers corresponding to documents to be indexed as part of an indexing process across at least a portion of a computing cluster;
- configuring multiple source components, wherein each of the multiple source components comprises a distributed actor system of multiple actors corresponding to one or more functions related to the indexing process, wherein the distributed actor system is hierarchical based at least in part on one or more communication dependencies among the multiple actors, and wherein configuring the multiple source components comprises specifying a number of instances of each actor per source component and a communication behavioral style associated with each instance;
- initiating the indexing process based on one or more inputs;
- iteratively requesting, via at least a portion of the multiple source components, at least one of the document identifiers;
- obtaining, via at least a portion of the multiple source components, from across at least a portion of the computing cluster, a document corresponding to a document identifier provided in response to the request; and
- carrying out, via at least a portion of the multiple source components, at least one of the one or more functions related to the indexing process on the obtained document;
- wherein the method is performed by at least one processing device comprising a processor coupled to a memory.

16. The computer-implemented method of claim 15, further comprising terminating the indexing process upon completion of the one or more functions on all of the documents to be indexed.

17. The computer-implemented method of claim 15, further comprising modifying the one or more functions to be carried out.

18. A computer program product comprising a non-transitory processor-readable storage medium having stored therein program code of one or more software programs, wherein the program code when executed by a processing platform comprising a plurality of processing devices causes the processing platform:
- to obtain and monitor a list of document identifiers corresponding to documents to be indexed as part of an indexing process across at least a portion of a computing cluster;
- to configure multiple source components, wherein each of the multiple source components comprises a distributed actor system of multiple actors corresponding to one or more functions related to the indexing process, wherein the distributed actor system is hierarchical based at least in part on one or more communication dependencies among the multiple actors, and wherein configuring the multiple source components comprises specifying a number of instances of each actor per source component and a communication behavioral style associated with each instance;
- to initiate the indexing process based on one or more inputs;
- to iteratively request, via at least a portion of the multiple source components, at least one of the document identifiers;
- to obtain, via at least a portion of the multiple source components, from across at least a portion of the computing cluster, a document corresponding to a document identifier provided in response to the request; and to carry out, via at least a portion of the multiple source components, at least one of the one or more functions related to the indexing process on the obtained document.

19. The computer program product of claim 18, wherein the program code further causes the processing platform to terminate the indexing process upon completion of the one or more functions on all of the documents to be indexed.

20. The computer program product of claim 18, wherein the program code further causes the processing platform to modify the one or more functions to be carried out by the multiple source components.

\* \* \* \* \*